Jan. 26, 1971

H. DE LANG ET AL  3,558,214

DEVICE FOR CONVERTING CIRCULARLY POLARIZED RADIATION
INTO PLANE POLARIZED RADIATION WITH A ROTATING
PLANE OF POLARIZATON

Filed Sept. 24, 1968  8 Sheets-Sheet 3

INVENTORS.
HENDRIK de LANG
GIJSBERTUS BOUWHUIS
PIETER KRAMER
BY

AGENT

United States Patent Office 3,558,214
Patented Jan. 26, 1971

3,558,214
DEVICE FOR CONVERTING CIRCULARLY POLARIZED RADIATION INTO PLANE POLARIZED RADIATION WITH A ROTATING PLANE OF POLARIZATION
Hendrik de Lang, Delft, and Gijsbertus Bouwhuis and Pieter Kramer, Emmasingel, Eindhoven, Netherlands, assignors, by mesne assignments, to U.S. Philips Corporation, a corporation of Delaware
Filed Sept. 24, 1968, Ser. No. 762,107
Claims priority, application Netherlands, Oct. 10, 1967, 6713762
Int. Cl. G02f 1/18
U.S. Cl. 350—150          19 Claims

ABSTRACT OF THE DISCLOSURE

A device for converting circular polarised radiation into plane-polarised radiation having a plane of polarisation rotating at a substantially constant speed features serially arranged anisotropic elements such as electro-optically or magneto-optical crystals. Each of the elements has its main directions in a selected angle with the main directions of the other crystals. To at least one crystal is applied an electromagnetic field, which has a selected phase relationship to the fields applied to the other crystals, if any.

---

Figure 1:
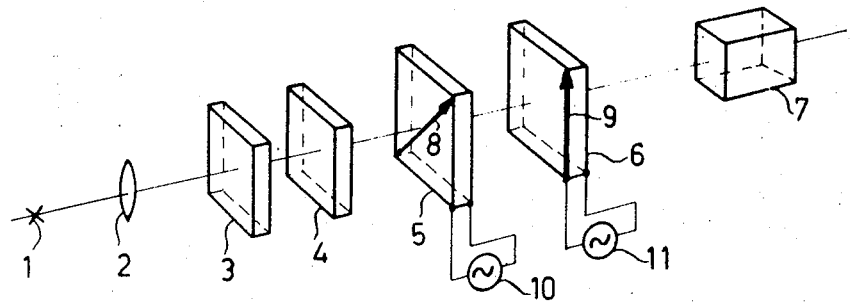

The invention relates to a device for converting circularly or substantially circularly polarised radiation into plane-polarised substantially plane-polarised radiation of the kind having a polarisation plane which rotates at a constant or substantially constant angular speed.

In a known device of this kind, the conversion is effected by means of a rotating ¼ λ-plate. The known device has the disadvantage that the speed of rotation of the plate and hence the frequency at which the plane of polarisation rotates is too low for many applications.

In another known device, the radiation passes through a Kerr cell the electric field of which rotates with time. This device has the disadvantage that a Kerr cell can be manipulated only with difficulty.

The invention has for its object to provide a device of the kind set forth, in which the drawbacks of the known devices are avoided. It is characterized in that the device comprises a series-combination of anisotropic elements, at least two of which are electro-optical or magneto-optical crystals, the relative orientation of these crystals and the electric voltages applied to or the magnetisations produced in said crystals being suitably chosen.

The electro-optical crystals used are preferably crystals exhibiting the Pockels effect. In these crystals, the double refraction is a linear function of the voltage applied to the crystals. An example of such a crystal is the so-called KDP-crystal which has a high stability and can be manipulated in a simple manner. The dielectric properties of a KDP-crystal permit high frequencies and high voltages. Such a crystal can therefore be deeply modulated at a high frequency.

Furthermore, crystals may be used which have a double refraction which is proportional to the square value of the voltage applied. An example of such a crystal is the so-called KTN-crystal. If such a crystal is connected to a voltage which is the sum of a direct voltage and a small alternating voltage, the double refraction is substantially linear with the alternating voltage.

If polarised radiation passes through the aforesaid electro-optical crystals, the state of polarisation of the radiation transmitted varies in a manner such that with variations of the voltage applied to the crystal the state of polarisation of the transmitted radiation varies.

The magneto-optical crystals used are crystals exhibiting the Faraday effect. In these crystals, the rotation of the plane of polarisation of plane-polarised radiation incident upon the crystal is a linear function of the magnetisations produced in the crystals. An example of such a crystal is a single crystal consisting of yttrium-iron-garnet (YIG) which has a high stability and can be manipulated in a simple manner. The dielectric properties of YIG permit comparatively high modulation frequencies, for example, of the order of 1 mc./s. Large anisotropies can be obtained with magnetic fields which are not extraordinarily large. Consequently, rotations of the plane of polarisation through large angles and at a high frequency can be obtained with such a crystal.

If polarised radiation passes through the aforesaid magneto-optical crystals, the state of polarisation of the radiation transmitted varies in a manner such that with variation of the voltage applied to the crystal the state of polarisation of the transmitted radiation varies.

Figure 2:
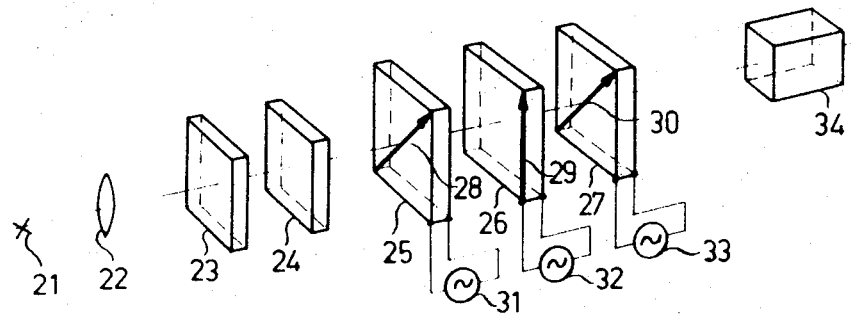
Figures 3A, 3B:
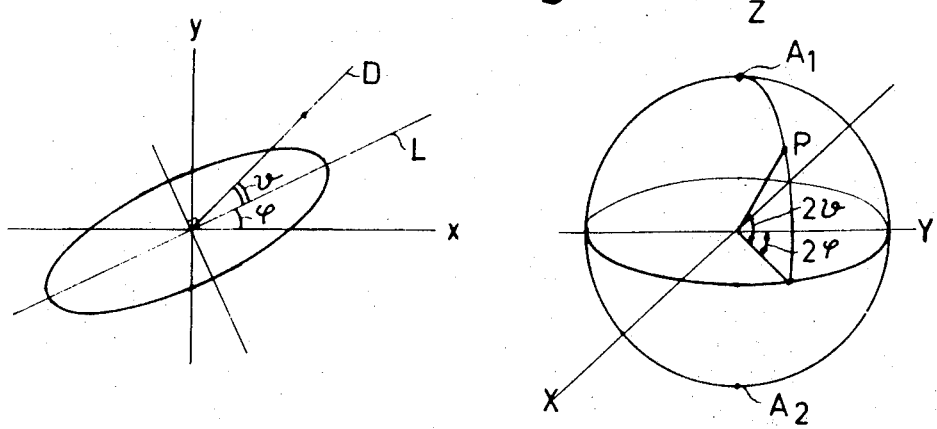
Figure 4:
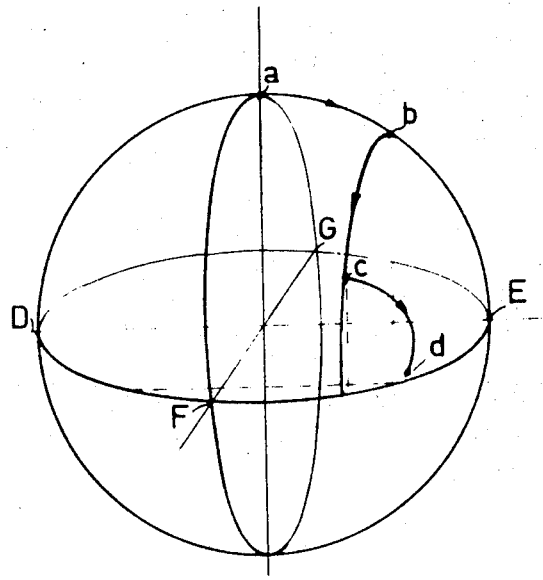
Figure 5:
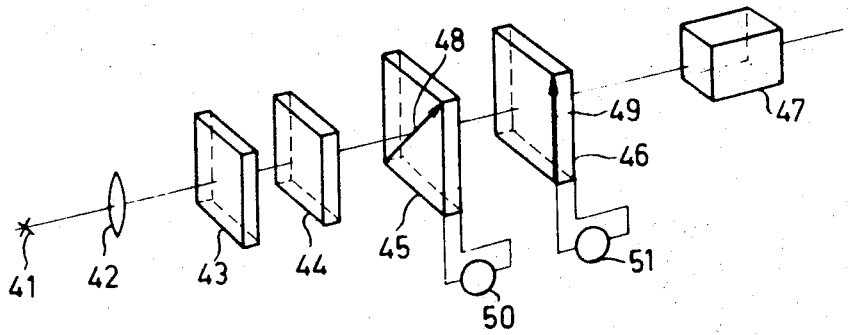
Figure 6:
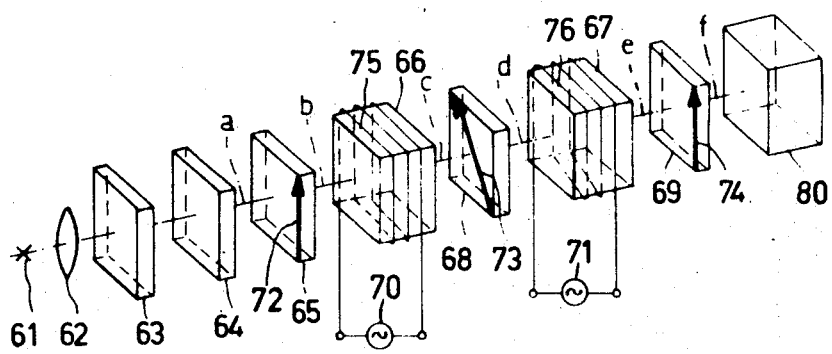
Figure 7A:
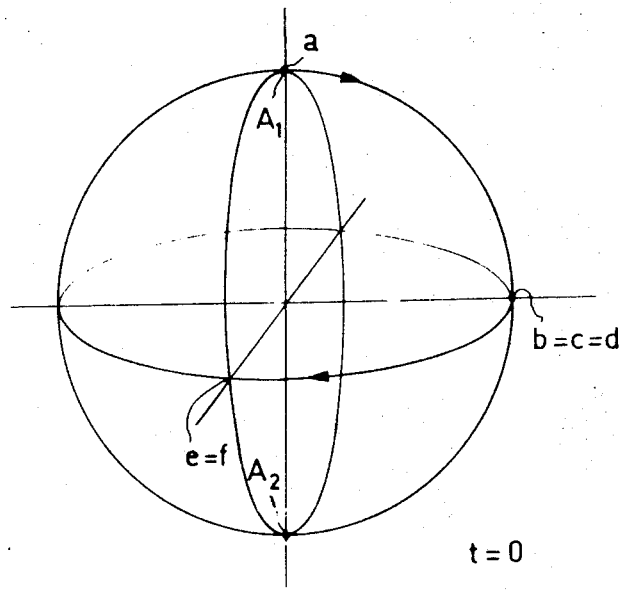
Figure 7B:
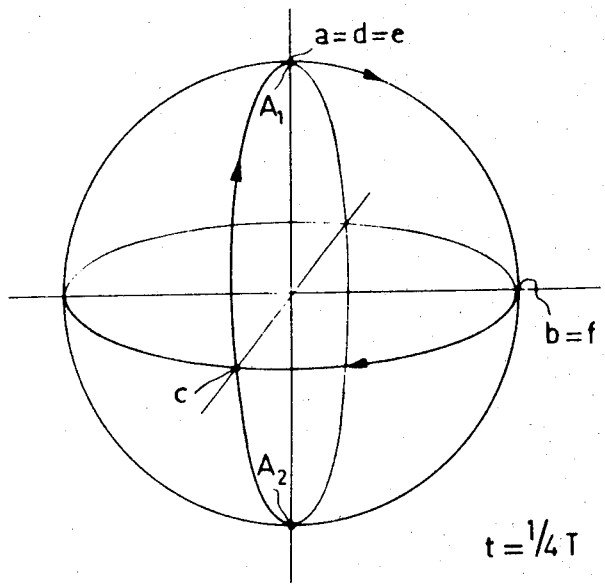
Figure 7C:
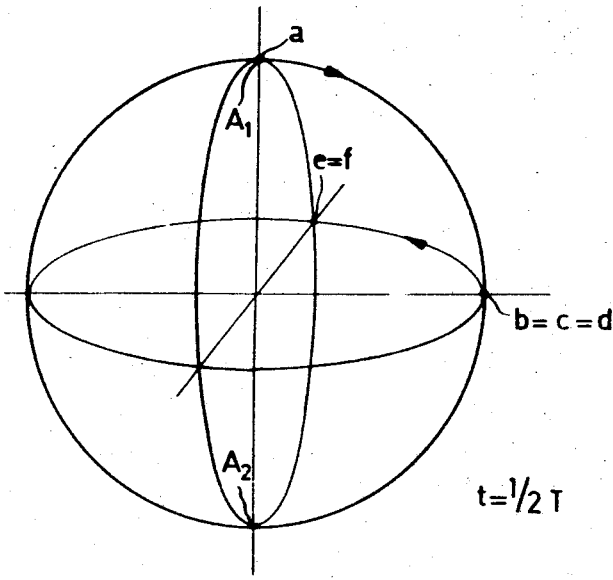
Figure 7D:
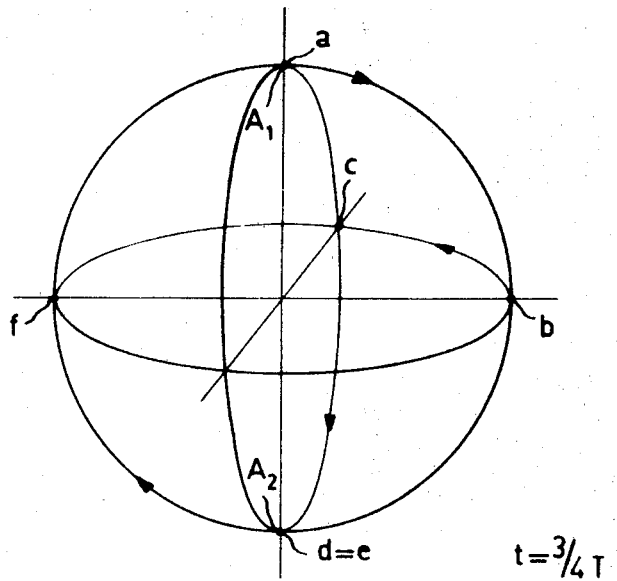
Figure 8:
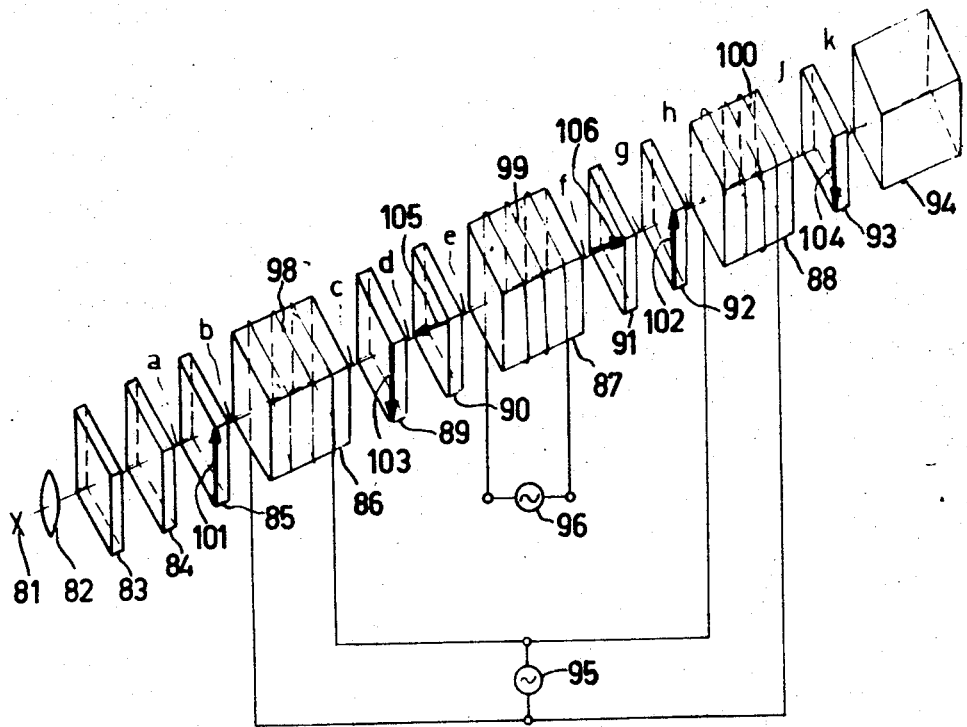
Figure 9:
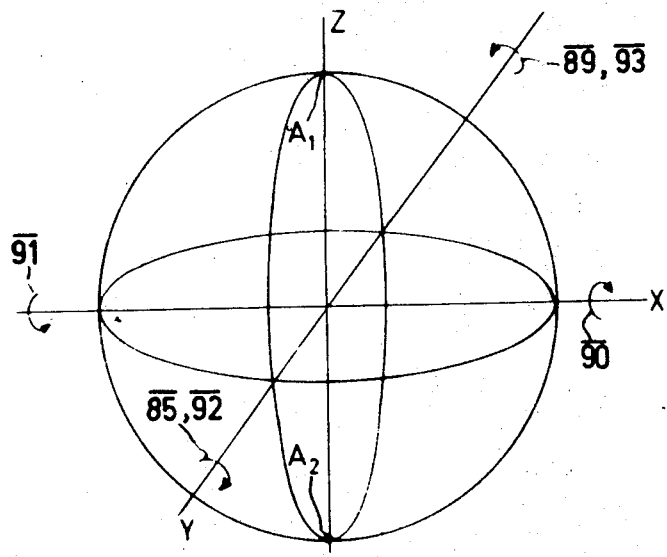

The invention will be described with reference to the drawing, in which FIG. 1 shows a first embodiment of a device according to the invention, FIG. 2 shows a second embodiment, FIGS. 3a, 3b and 4 show geometric representations, FIG. 5 shows a third embodiment, FIG. 6 shows a fourth embodiment of a device according to the invention, FIGS. 7a to 7d show geometric representations, FIG. 8 shows a fifth embodiment, and FIGS. 9 and 10a to 10d show geometric representations.

In the device shown in FIG. 1, the radiation originating from the light source 1 and converted by the lens 2 into a parallel beam is incident upon the polarizer 3 and subsequently upon the ¼ λ-plate 4. Plane-polarized light is emitted from the polarizer 3 and is converted by the ¼ λ-plate into circularly polarized light.

The circularly polarized light passes the series-combination of two Pockels crystals 5 and 6, the main directions of which, indicated by arrows 8 and 9, are at an angle of 45° to each other. In every birefringent crystal there is a direction called a "fast direction," for which, if the light beam is polarized in this direction, the beam velocity is a maximum. Similarly there is a "slow direction" for which the velocity is a minimum. These two directions are perpendicular to each other, and together are called the "main directions." An alternating voltage $V_1 = V_0 \sin \omega t$ from the alternating voltage source 10 is applied to the crystal 5 and an alternating voltage $V_2 = V_0 \cos \omega t$ from the alternating voltage source 11 to the crystal 6. As an alternative, for example, one source may be employed and a phase-shift network may be included in the lead between the source and one of the crystals. The voltages $V_1$ and $V_2$ are applied so that the field strength produced by the voltage in the crystals 5 and 6, respectively, is parallel to the direction of propagation of the light in the crystal.

The amplitude $V_0$ is so large that circularly polarized light incident upon the crystals 5 and 6, respectively, is converted at this voltage into plane-polarised light. For $V_0$ is chosen to be so large that a phase difference of one quarter wavelength occurs between the two vibrations of which the circularly polarised light is composed. In an embodiment, in which the crystals 5 and 6 were KDP crystals, $V_0$ was equal to 8 kv. The double refraction of a KDP crystal is approximately 180 AU per kv. and the light used had a wavelength λ=6000 AU.

The position of the polarisation plane of the emitted light can be readily calculated for four instants.

For $$t=0,\ V_1=V_0 \sin \omega t = V_0 \sin \frac{2\pi}{T}\ T=0$$

and $$V_2 = V_0 \cos \omega t = V_0 \cos \frac{2\pi}{T} t = V_0$$

The crystal 6 converts the circularly polarised light into plane-polarised light. The position of the polarisation plane relative to a reference plane is chosen to be 0°.
For $$t = \tfrac{1}{4}T, \; V_1 = V_0 \sin \frac{2\pi}{T} \frac{T}{4} = V_0$$

and $$V_2 = V_0 \cos \frac{2\pi}{T} \frac{T}{4} = 0$$

The crystal 5 converts the circularly polarised light into plane-polarised light. The position of the polarisation plane relative to the reference plane is 45°. For the main directions of the crystals 5 and 6 make an angle with each other of 45°.
For $$t = \tfrac{1}{2}T, \; V_1 = V_0 \sin \frac{2\pi}{T} \frac{T}{2} = 0$$

and $$V_2 = V_0 \cos \frac{2\pi}{T} \frac{T}{2} = -V_0$$

The crystal 6 converts the circularly polarised light into plane-polarised light. The position of the polarisation plane relative to the reference plane is 90°.
For $$t = \tfrac{3}{4}T, \; V_1 = V_0 \sin \frac{2\pi}{T} \cdot \tfrac{3}{4}T = -V_0$$

and $$V_2 = V_0 \cos \frac{2\pi}{T} \cdot \tfrac{3}{4}T = 0$$

The crystal 5 converts the circularly polarised light into plane-polarised light. The position of the polarisation plane relative to the reference plane is 135°.
For $t = T$, $V_1 = 0$ and $V_2 = V_0$.

The crystal 6 converts the circularly polarised light into plane-polarised light. The position of the polarisation plane relative to the reference plane is 180°, in other words, the polarisation plane coincides with the reference plane, or the position of this polarisation plane relative to the reference plane is 0°.

The position of the polarisation plane has shifted proportionally with the time $t$ for four instants, i.e. $t=0$, $t=\tfrac{1}{4}T$, $t=\tfrac{1}{2}T$, $t=\tfrac{3}{4}T$ and $t=T$. There are deviations from the proportionality for intermediate instants. The speed of rotation of the polarisation plane is not constant. Moreover, the light emerging from the series-combination of the crystals is slightly elliptically polarised for these intermediate instants. It can be calculated that for intermediate instants the deviation from the proportionality with time varies from $-20°$ to $+20°$ and the ratio of the amplitude of the right-circularly polarised light to that of the left-circularly polarised light varies from 1.2 to 0.8.

The use of the arrangement shown in FIG. 2 results in an improvement in linearity. In FIG. 2, the light from the light source 21 is incident through a lens 22 upon a polariser 23 and subsequently upon a ¼λ-plate 24. Circularly polarised light emerges from the ¼λ-plate 24 and passes the series-combination of three electro-optical crystals 25, 26 and 27. The main directions of the crystals 25 and 27 are parallel to each other, whilst the main direction of the crystal 26 is at angle of 45° to the main directions of the crystals 25 and 27.

If the voltage $V_1$ from the source 31 is chosen to be equal to the voltage $V_3$ from the source 33: $V_1 = V_3 = V_{13} \sin \omega t$, and if the voltage $V_2$ from the source 32 is chosen to be equal to $V_2 = V_{22} \cos \omega t$, it has been found that with a suitable choice of $V_{13}$ and $V_{22}$, i.e. $V_{13} = 48/90 \; V_0$ and $V_{22} = 82/90 \; V_0$, both the linearity of the state of polarisation and that of the rotation of the polarisation plane with time of the radiation emerging from the series-combination are considerable. It can be calculated that for instants between $t=0$ and $t=\tfrac{1}{4}T$, between $t=\tfrac{1}{4}T$ and $t=\tfrac{1}{2}T$, between $t=\tfrac{1}{2}T$ and $t=\tfrac{3}{4}T$, and between $t=\tfrac{3}{4}T$ and $t=T$, the deviation from the proportionality with time varies between $-1.5°$ and $+1.5°$ and the ratio of the amplitude of the right-circularly polarised light to that of the left-circularly polarised light varies between 1.1 and 0.9.

This can be illustrated by means of the globe of Poincare (cf. also "Principles of Optics" of Born and Wolf (pages 30 and 31) which represents all kinds of states of polarisation).

A state of polarisation is characterized by an ellipse in the $xy$-plane (FIG. 3$a$) the longitudinal axis L of which is at an angle $\varphi$ to the $x$-axis, whilst the diagonal D of the circumscribed rectangle is at an angle $\vartheta$ to L. The ratio of the axes of the ellipse is given by: $\tan \vartheta$.

On the globe of Poincare (FIG. 3$b$), the point P is characterized by the angles $2\varphi$ and $2\vartheta$. There is an unambiguous relation between the state of polarisation and the associated point on the globe.

The angle $\vartheta = 0°$ (plane-polarised light, cf. FIG. 3$a$) corresponds to points on the equator of the globe, that it so say that the equator represents all the linear states.

The angle $\vartheta = 45°$ (circularly polarised light) corresponds to the poles ($A_1$ and $A_2$) of the globe.

Linear phase anisotropy, which occurs in doubly-refracting crystals, and hence in λ/4-plates can be represented as a rotation about a horizontal axis in the plane of the equator.

The variation of the polarisation in the device shown in FIG. 2 can be represented on the globe of Poincare in the manner shown in FIG. 4 for the instant $t = T/8$. Start is made of circularly polarised light between the elements 24 and 25 (point $a$). Via the arcs of a circle $ab$, $bc$ and $cd$, the point $d$, which approximately lies on the equator, is reached. The arc of a circle $ab$ is obtained by rotation about the axis FG through an angle $$48° \sin \omega t = 48° \sin \frac{2\pi}{T} \frac{T}{8} = 34°$$

the arc of a circle $bc$ by rotation about the axis DE through an angle $$82° \cos \frac{\pi}{4} = 58°$$

and the arc of a circle $cd$ again by rotation about the axis FG through an angle $$48° \sin \frac{\pi}{4} = 34°$$

The axes of rotation DE and FG are at right angles to each other.

It will be appreciated that even more satisfactory results can be obtained with 5 or 7, in general with $2n+1$, crystals.

The speed of rotation of the polarisation plane may be varied by varying $\omega$.

The conversion of circularly polarised light in plane-polarised light may alternatively be effected by applying pulsatory voltages to two crystals, the main directions of which are at an angle to each other of 45°. In the device shown in FIG. 5, the radiation originating from the light source 41 and converted into a parallel beam by a lens 42 is incident upon the polarizer 43 and subsequently upon the ¼ λ-plate 44. Plane-polarised light emerges from the polarizer 43 and is converted into circularly polarised light by the ¼ λ-plate 44.

The circularly polarised light passes the series-combination of two Pockels crystals 45 and 46 the main directions of which, indicated by arrows 48 and 49, are at an angle to each other of 45°. The pulsatory voltage from the source 51 at the second crystal 46 is equal to $+V_0$ during one half of each period, whilst the pulsatory voltage from the source 50 at the first crystal 45 increases linearly from $-V_0$ to $+V_0$. During the other half of each period, the voltage at the second crystal equals $-V_0$, whilst the voltage at the first crystal decreases linearly from $+V_0$ to $-V_0$.

As a matter of course, in order to avoid high voltages, each crystal can be subdivided into a number of component crystals. Each partial crystal then has a voltage applied to it having an amplitude which is a factor $n$ smaller than that of the voltage at the undivided crystal if $n$ is the number of component crystals.

Optically active or doubly-refracting elements may be arranged between two successive crystals. The relative orientation of the crystals is then fully or partly determined by these elements.

The element 7, 34 and 47, respectively, in FIG. 1, FIG. 2 and FIG. 5, respectively, comprises a photoelectric detection system.

In the device of FIG. 6, the radiation emitted by the light source 61 and converted by the lens 62 into a parallel beam is incident upon the polariser 63 and then upon the $\lambda/4$-plate 64. Plane-polarised light is emitted from the polariser 63 and is converted into circularly polarised light by the ¼ λ-plate.

The circularly polarised light then passes the series-combination of the $\lambda/4$-plate 65, the magneto-optical crystal 66, the $\lambda/4$-plate 68, the magneto-optical crystal 67 and the $\lambda/4$-plate 69. The main direction of the $\lambda/4$-plate 65 indicated by the arrow 72 is parallel to the main direction of the $\lambda/4$-plate 69 indicated by the arrow 74, whilst the main direction of the $\lambda/4$-plate 68 indicated by the arrow 73 is at an angle of 45° to that of the plates 65 and 69.

In the crystals 66 and 67, which preferably consist of yttrium-iron-garnet (YIG), magnetisations are produced which are parallel or substantially parallel to the direction of propagation of the radiation in the relevant crystal. The alternating current source 70 produces a magnetisation $B_1 = B_0 \sin \omega t$ by means of the coil 75. The alternating-current source 71 produces the magnetisation $B_2 = B_0 \cos \omega t$ by means of the coil 76. As an alternative, one source may be used and a phase-shift network may be included in the lead between the source and one of the crystals.

The amplitude $B_0$ of the magnetisation is so large that the plane of polarisation of plane-polarised light incident upon the crystals 66 and 67, respectively, rotates through 45° at this value of the field.

In an embodiment in which the crystals 66 and 67 are single YIG crystals, the crystals had a length of 4 cm. The magnetic field applied had an amplitude of 1 Oe. The permeability of the crystals was 200 so that $B_0$ was equal to 200 gauss.

The position of the plane of polarisation of the light emitted from the series-combination can be readily found for four instances. For $$t=0, B_1 = B_0 \sin \omega t = B_0 \sin \frac{2\pi}{T} t = 0$$

and $$B_2 = B_0 \cos \omega t = B_0 \cos \frac{2\pi}{T} t = B_0$$

The $\lambda/4$-plate 65 converts the circularly polarised light into plane-polarised light, the plane of polarisation of which is at an angle of 45° to the main direction of the plate. The state of polarisation of the light does not change in the crystal 66 and in the $\lambda/4$-plate 68, since $B_1$ is equal to 0 and the main direction of the plate 68 is parallel to the direction of polarisation of the incident light. The direction of polarisation of the light in the crystal 67 is rotated through 45°, whilst the state of polarisation of the light incident upon the $\lambda/4$-plate 69 does not change, since the main direction of this plate is parallel to the direction of polarisation of the incident light. Plane-polarised light having a direction of polarisation parallel to the main direction of the plate 69 is incident upon the detector 80.

For $$t = T/4, B_1 = B_0 \sin \omega t = B_0 \sin \frac{2\pi}{T} T/4 = B_0$$

and $B_2 = B_0 \cos \omega t = 0$. The light emitted from the $\lambda/4$-plate 65 is again plane-polarised in a direction which is at an angle of 45° to the main direction of the plate 65. The plane of polarisation of the radiation is rotated through 45° in the crystal 66. The plane of polarisation of the light incident upon the $\lambda/4$-plate 68 is therefore at an angle of 45° to the main direction of the plate 68. Thus, the plate 68 emits circularly polarised light, the state of polarisation of which does not change in the crystal 67 because $B_2 = 0$. The circularly polarised light in the $\lambda/4$-plate 69 is converted into plane-polarised light, the plane of polarisation of which is at an angle of 45° to the main direction of the plate 69. Light having a direction of polarisation which is at an angle of 45° to the main direction of the plate 69 is incident upon the detector 80.

For $$t = T/2, B_1 = B_0 \sin \omega t = B_0 \sin \frac{2\pi}{T} T/2 = 0$$

and $$B_2 = B_0 \cos \frac{2\pi}{T} T/2 = B_0$$

The light emitted from the $\lambda/4$-plate 65 is again plane-polarised in a direction which is at an angle of 45° to the main direction of the plate 65. The state of polarisation of this light does not change in crystal 66 and in the $\lambda/4$-plate 68, since the field $B_1$ is equal to 0 and the main direction of the plate 68 is parallel to the direction of polarisation of the incident light. In the crystal 67 the plane of polarisation of the radiation is rotated through 45°, i.e. in a direction opposite to that for $t=0$, since the field $B_2$ is equal and opposite to the value for $t=0$. The crystal 67 emits plane-polarised light having a direction of polarisation which is at an angle of 90° to the main direction of the $\lambda/4$-plate 69. The state of polarisation of this light does not change in the plate 69. Plane-polarised radiation having a plane of polarisation which is at angle of 90° to the main direction of the $\lambda/4$-plate 69 is incident upon the detector 80.

For $$t = \tfrac{3}{4}T, B_1 = B_0 \sin \frac{2\pi}{T} 3T/4 = -B_0$$

and $B_2 = B_0 \cos \omega t = 0$. The $\lambda/4$-plate 65 again converts the incident circularly polarised light into plane-polarized light having a direction of polarisation which it as an angle of 45° to the main direction of the plate 65. In the crystal 66, the plane of polarisation of the radiation is rotated through 45°, i.e. in a direction opposite to that for $t = T/4$, since the field $B_1$ is equal and opposite to the value for $t = T/4$. The crystal 66 emits plane-polarised radiation having a direction of polarisation which is at an angle of $-45°$ to the main direction of the $\lambda/4$-plate 68. The plate therefore emits circularly polarised light having a direction of rotation which is opposite to that for $t = T/4$. The state of polarisation of this light does not change in the crystal 67. In the $\lambda/4$-plate 69, the circularly polarised light is converted into plane-polarised light having a plane of polarisation which is at an angle of $-45°$ to the main direction of the plate 69. Plane-polarised light having a direction of polarisation which is at an angle of 45° to the main direction of the plate 69 and at an angle of 90° to the light incident upon the detector 80 for $t = T/4$ is incident upon this detector, since the direction of rotation of the circularly polarised light incident upon the plate 69 for $t=3T/4$ is opposite to that for $t=T/4$.

The position of the plane of polarisation has rotated in proportion to the time $t$ for four instants, i.e. $t=0$, $t=T/4$, $t=T/2$, $t=3T/4$ and $t=T$. For intermediate instants, there are deviations from the proportionality. The speed of rotation of the plane of polarisation is not constant. Moreover, the light emitted from the series-combination of the crystals and the λ/4-plates is slightly elliptically polarised for these intermediate instants. It can be calculated that for intermediate instants, the deviation linear with time varies between $-20°$ and $+20°$ and that the ratio of the amplitude of the right-circularly polarised light to that of the left-circularly polarised light lies between 1.2 and 0.8.

This can be illustrated again with the aid of the globe of Poincare.

Linear phase anisotropy, which occurs in doubly-refracting crystals and hence in λ/4-plates, can be represented as a rotation about a horizontal axis in the plane of the equator.

In particular, for λ/4-plates, this rotation is 90°. For magneto-optical crystals, the rotation of the plane of polarisation through $\alpha$ can be represented as a rotation through $2\alpha$ about the axis passing through the poles $A_1$ and $A_2$.

FIGS. 7a to 7d show the states of polarisation for the instants $t=0$, $t=T/4$, $t=T/2$ and $t=3T/4$, respectively, of the radiation at $a$ to $f$ (cf. FIG. 1). The point $a$ lies between the λ/4-plate 64 and the λ/4-plate 65, the point $b$ between the λ/4-plate 65 and the crystal 66, etc.

It can be seen that the states of polarisation at $f$ lie on the equator of the globe for each of the four instants at relative distances of one quarter of the circumference of the equator. These distances correspond to a rotation of 45° of the plane of polarisation of the plane-polarised radiation at $f$.

In the device of FIG. 6, another λ/4-plate may be interposed between the λ/4-plate 68 and the crystal 66. The main direction of this plate must be opposite to that of the λ/4 plate 65, whilst the main direction of the plate 69 must be opposite to that of the plate 68.

In the device of FIG. 8, the linearity of the emitted light for intermediate instants, i.e. instants deviation from $t=0$, $t=T/4$, $t=T/2$, $t=3T/4$, $t=T$, etc., is improved when compared with that obtained in the device of FIG. 6.

In the device of FIG. 8, the radiation emitted by the light source 81 and converted by the lens 82 into a parallel beam is incident upon the polariser 83 and then upon the λ/4-plate 84. The polariser 83 emits plane-polarised light which is converted into circularly polarised light by the λ/4-plate 84.

The circularly polarised light then passes the series-combination of the λ/4-plate 85, the magneto-optical crystal 86, the λ/4-plate 89, the λ/4-plate 90, the magneto-optical crystal 87, the λ/4-plate 91, the λ/4-plate 92, the magneto-optical crystal 88 and the λ/4-plate 93. The main direction of the plate 85 indicated by the arrow 101 is equal to the main direction of the plate 92 indicated by the arrow 102. The main direction of the plate 89 indicated by the arrow 103 is equal to the main direction of the plate 93 indicated by the arrow 104 and opposite to that of the plates 85 and 92. The main direction of the plate 90 indicated by the arrow 105 is opposite to the main direction of the plate 91 indicated by the arrow 106. The main direction at the plates 89 and 90 and that of the plates 91 and 92 are at an angle of 45° to each other.

In the crystals 86, 87 and 88, magnetisations are produced which are parallel or substantially parallel to the direction of propagation of the radiation in the relevant crystal. The alternating-current source 95 produces the magnetisation $B_1=\frac{1}{2}B_0 \sin \omega t$ by means of the coil 98 in the crystal 86 and by means of the coil 100 in the crystal 88. The alternating-current source 96 produces the magnetisation $B_2=B_0 \cos \omega t$ in the crystal 87 by means of the coil 99. The amplitudes $B_0$ and $\frac{1}{2}B_0$, respectively, are so large that the plane of polarisation of plane-polarised light incident upon the crystals 87 and 86 or 88, respectively, rotates through 45° and through 22°30' at this value of the field.

The position of the plane of polarisation of the light emitted from the series-combination can again be readily found for four instants. Since the series-combination comprises a large number of elements, the time evolution of the state of polarisation of the light beam can only be closely followed with great difficulty. Therefore, only an explanation is given with the aid of the globe of Poincare (of FIG. 9). The arrows $\overline{85}$ and $\overline{92}$, $\overline{89}$ and $\overline{93}$ at the Y-axis indicate the directions of rotation about the Y-axis which are represented on the globe when the light traverses the λ/4-plates 85; 92 and 89; 93, respectively. The arrows 90 and 91 at the X-axis indicate the direction of rotation about the X-axis which is represented on the globe when the light traverses the λ/4-plates 90 and 91, respectively.

For $t=0$, the direction of polarisation of the circularly polarised light incident upon the λ/4-plate 85 is represented at $a$ (FIG. 8) by the point A (FIG. 10a) and after passage through the λ/4-plate 85 at $b$ (FIG. 8) by the point B, since passage through a λ/4-plate implies rotation through 90° about an axis, in this case the Y-axis, in the plane of the equator. The state of polarisation of the light does not change in the crystal 86. The state of polarisation at $c$ is thus represented by the point $C=B$. After passage through the λ/4-plate 89, the state of polarisation at $d$ is represented by the point $D=A$, since passage through the plate 89 implies a rotation through 90° about the Y-axis. After passage through the λ/4-plate 90, the state of polarisation at $e$ is represented by E, since passage through the plate 90 implies a rotation about the X-axis through 90°. The plane of polarisation of the plane-polarised light at $e$ is rotated through 45° in the crystal 87, since $B_2=B_0$. On the globe of Poincare, the point $F(=B=C)$ is reached. The plate 91 does not change the state of polarisation (passage through this plate implies a rotation on the globe about the X-axis) so that at $g$ the state of polarisation is represented by the point $G=F$. By the passage through the plate 92, the plane-polarised light is reconverted into circularly polarised light. On the globe of Poincare the point H is reached by a rotation about the Y-axis through 90°. In the crystal 88, the state of polarisation does not change. The state of polarisation at $j$ remains at the point $J=H$. After passage through the λ/4-plate 104, the state of polarisation of the light, for example, at $k$, is represented by the point $K(=B)$, since a rotation through 90° is performed about the Y-axis.

Figure 10A:
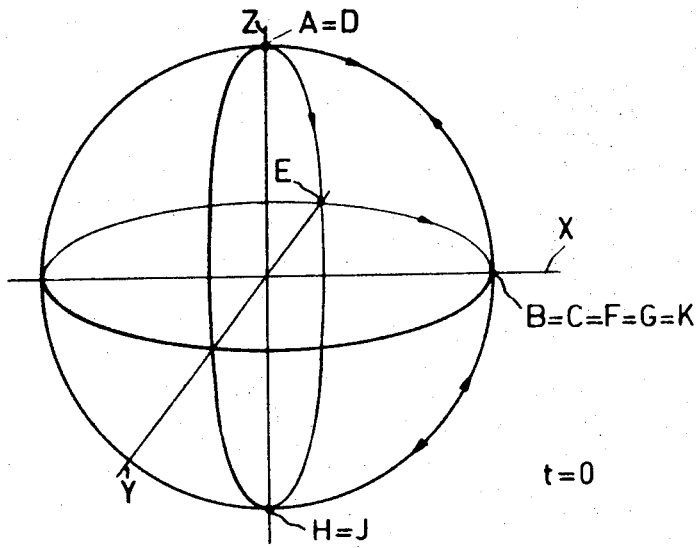
Figure 10B:
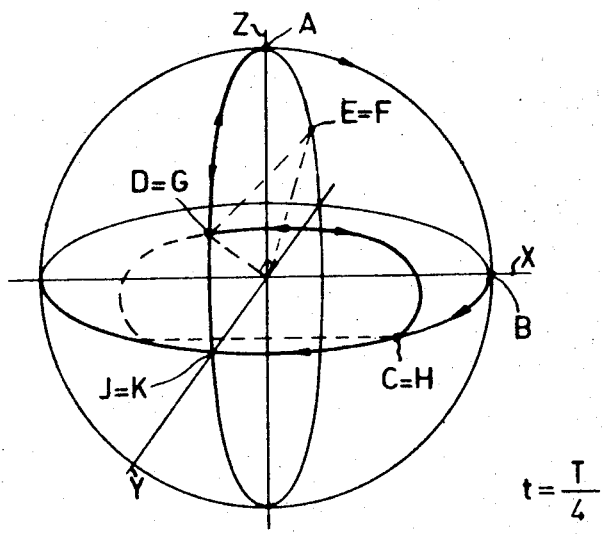
Figure 10C:
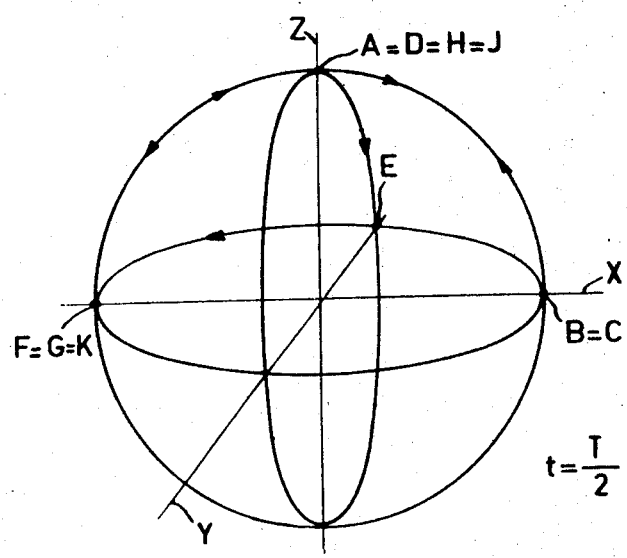
Figure 10D:
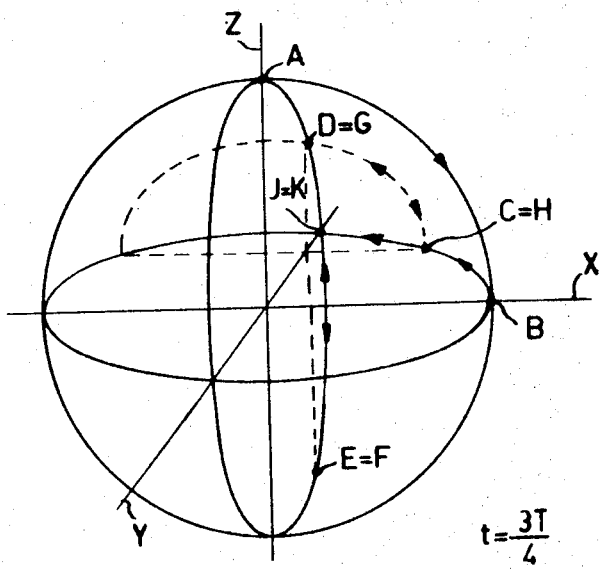

FIGS. 10b, 10c and 10d illustrate manipulations on the globe of Poincare simila rto the manipulation shown in FIG. 10a, i.e. for the instants $t=T/4$, $t=T/2$ and $t=3T/4$, respectively. It can be seen that each time when $t$ has increased by $T/4$ the point K is displaced along the equator over a distance corresponding to a rotation of 90° of the plane of polarisation. Calculations have shown that also for intermediate instants the rotation varies substantially linearly with time. The deviations are at the most 5°. They are even smaller if $B_1$ is chosen to be equal to $^{48}\!/_{90}B_0$ and $B_2$ to be equal to $^{82}\!/_{90}B_0$.

What is claimed is:

1. An optical device for controlling a circular polarised beam of light, comprising means for converting the circular polarised light beam into plane polarised light having a plane of polarisation rotating at a substantially constant speed including a plurality of anisotropic optical elements serially arranged and numbered with respect to said light beam and each having a main direction in a predetermined direction with respect to said other elements, said elements having a varying anisotrophy with the application of an electromagnetic field, and means for applying an electromagnetic field to each of said elements, the amplitude of said electromagnetic field being sufficiently great to convert circularly polarized light into plane polarized light.

2. A device as claimed in claim 1 wherein said elements comprise two electro-optical crystals whose main directions are at an angle of 45 degrees with respect to each other.

3. A device as claimed in claim 2 wherein said field comprises an electric field having a triangular waveshape for the first crystal and a square waveshape for the second crystal, the peak amplitude values being equal.

4. A device as claimed in claim 2 wherein said field comprises an electric field, said field causing a shift of one quarter wavelength in one of said crystals.

5. A device as claimed in claim 1 wherein said elements comprise three electro-optical crystals, the main directions of the outer crystals being parallel to each other and at an angle of 45 degrees with respect to the main directions of the middle crystal.

6. A device as claimed in claim 5 wherein said field comprises an electric field, said field causing a shift of one eighth wavelength in said outer crystals and one quarter wavelength in said middle crystal.

7. A device as claimed in claim 1 wherein said elements comprise an odd number of electro-optical crystals.

8. A device as claimed in claim 1 wherein said elements comprise electro-optical crystals and said electromagnetic field comprises an electric field, said field applied to adjacent crystals being 90 degrees out of phase.

9. A device as claimed in claim 1 wherein each of said elements comprises a plurality of sub-elements and said field applied to said sub-elements is reduced by a factor proportional to the number of sub-elements.

10. A device as claimed in claim 1 further comprising a plurality of doubly refracting units disposed between said elements.

11. A device as claimed in claim 1 wherein the number of crystals is odd.

12. A device as claimed in claim 1 wherein each of said elements comprises a magneto-optical crystal and further comprising one quarter wavelength plates disposed adjacent said crystals, adjacent plates having differently disposed main directions.

13. A device as claimed in claim 12 wherein said crystals are two in number the main directions of the end plates being parallel and at a 45 degree angle with respect to the main directions of the middle plate.

14. A device as claimed in claim 12 wherein the crystals are three in number and the main directions of the plates adjacent one of said crystals are in opposite directions and at a 45 degree angle with respect to the plates adjacent the remaining crystals.

15. A device as claimed in claim 12 wherein said crystals are three in number, said plates adjacent the same crystal having main directions oppositely disposed, the main directions of the plates enclosing the center crystal being at a 45 degree angle with respect to main directions of the plates adjacent the end crystals.

16. A device as claimed in claim 15 wherein said outer crystals cause a 22°30′ rotation of the polarisation plane, and said center crystal causes a 45 degree rotation of said plane.

17. A device as claimed in claim 12 wherein the magnetic field applied to adjacent crystals is 90 degrees out of phase with respect to each other.

18. A device as claimed in claim 12 wherein the groups of the even and odd numbered crystals each cause a 90 degree rotation of the polarisation plane.

19. A device as claimed in claim 12 wherein at least one crystal causes a 45 degree rotation of the polarisation plane.

References Cited
UNITED STATES PATENTS 3,239,671    3/1966    Buhrer      350—150X
3,272,988    9/1966    Bloom et al.      350—151X DAVID SCHONBERG, Primary Examiner P. R. MILLER, Assistant Examiner U.S. Cl. X.R.
350—151, 157